United States Patent
Subramaniyan et al.

(10) Patent No.: US 10,481,874 B2
(45) Date of Patent: Nov. 19, 2019

(54) SYSTEM ARCHITECTURE FOR SECURE AND RAPID DEVELOPMENT, DEPLOYMENT AND MANAGEMENT OF ANALYTICS AND SOFTWARE SYSTEMS

(71) Applicant: General Electric Company, Schenectady, NY (US)

(72) Inventors: Arun Karthi Subramaniyan, Niskayuna, NY (US); John Lazos, Niskayuna, NY (US); Natarajan Chennimalai Kumar, Niskayuna, NY (US); Alexandre Iankoulski, Niskayuna, NY (US); Renato Giorgiani Do Nascimento, Rio de Janeiro (BR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/338,839

(22) Filed: Oct. 31, 2016

(65) Prior Publication Data
US 2018/0121170 A1 May 3, 2018

(51) Int. Cl.
*G06F 8/20* (2018.01)
*G06F 8/35* (2018.01)
*G06F 8/61* (2018.01)
*G06F 8/34* (2018.01)
*G06F 9/54* (2006.01)

(52) U.S. Cl.
CPC .............. *G06F 8/20* (2013.01); *G06F 8/34* (2013.01); *G06F 8/35* (2013.01); *G06F 8/61* (2013.01); *G06F 9/541* (2013.01)

(58) Field of Classification Search
None
See application file for complete search history.

(56) References Cited

U.S. PATENT DOCUMENTS

| | | | |
|---|---|---|---|
| 7,149,734 B2 | 12/2006 | Carlson et al. | |
| 7,353,502 B2 * | 4/2008 | Stewart | G06F 8/36 717/136 |
| 7,802,230 B1 * | 9/2010 | Mendicino | G06F 9/541 717/105 |
| 8,533,676 B2 | 9/2013 | Watters et al. | |

(Continued)

FOREIGN PATENT DOCUMENTS

WO 2006/135607 A2 12/2006

OTHER PUBLICATIONS

Kon, "The Case for Reflective Middleware", 2002, Communications of the ACM—Adaptive middleware CACM, ACM.*

(Continued)

*Primary Examiner* — Hossain M Morshed
(74) *Attorney, Agent, or Firm* — Buckley, Maschoff & Talwalkar LLC

(57) ABSTRACT

According to some embodiments, system, apparatus and methods are provided comprising one or more component models of an analytic model for an installed product; an application programming interface (API) wrapper associated with each of the one or more component models, the API wrapper including information about one or more inputs to the component model; and wherein the component model and the API wrapper form a self-aware component. Numerous other aspects are provided.

25 Claims, 14 Drawing Sheets

(56) References Cited

U.S. PATENT DOCUMENTS

| | | | |
|---|---|---|---|
| 8,745,585 B2 | 6/2014 | Watters et al. | |
| 9,020,868 B2 | 4/2015 | Elkins et al. | |
| 2003/0189902 A1* | 10/2003 | Lloyd | H04L 43/50 370/241 |
| 2011/0295865 A1* | 12/2011 | Carroll | G06F 16/86 707/756 |
| 2016/0034380 A1 | 2/2016 | Shani et al. | |
| 2016/0124742 A1* | 5/2016 | Rangasamy | H04L 47/70 |
| 2018/0121170 A1* | 5/2018 | Subramaniyan | G06F 8/20 |
| 2018/0121171 A1* | 5/2018 | Subramaniyan | G06F 8/20 |
| 2018/0121183 A1* | 5/2018 | Subramaniyan | G06F 8/60 |
| 2018/0121258 A1* | 5/2018 | Subramaniyan | G06F 9/541 |

OTHER PUBLICATIONS

Kobielus, "Deploying analytics microservices in the cloud", Feb 2016, IBM, Located at http://www.ibmbigdatahub.com/blog/deploying-analytics-microservices-cloud.*

MuleSoft, "What exactly is an API wrapper? and how does it differ from just an API?", 2017, located at https://www.quora.com/What-exactly-is-an-API-wrapper-And-how-does-it-differ-from-just-an-API.*

Sparx, "UML Tutorials, The Component Model", 2004, Sparx Systems, https://www.sparxsystems.com.au/downloads/whitepapers/The_Component_Model.pdf.*

Liao, "A vision for the self-Aware Machine", 2013, Published by Parc at http://blogs.parc.com/2013/12/a-vision-for-the-self-aware-machine/.*

Flores, "Testing-based Process for Evaluating Component Replaceability", 2009, Published by ScienceDirect.*

Raj, "Use big data and fast data analytics to achieve analytics as a service", 2015, Published by IBM.*

Wetware, "API users & API wrappers", 2010, Published at https://yosefk.com/blog/api-users-api-wrappers.html.*

Wiseuser, "Is Self Registration a Best Method to register a dll in MSI", 2009, Published by Symantec.*

Oracle, "Sun Fire X2270 M2 Server Service Manual", 2012, Published by Oracle.*

Orso, "Component Metadata for Software Engineering Tasks", 2001, Published by Springer Link.*

Rubinfeld, "A Mathematical Theory of Self-Checking, Self-Testing and Self-Correcting Programs", 1990, Published by ACM.*

Mariani, "Generation of Integration Tests for Self-Testing Components", 2004, Published by Springer.*

Liao, "A Vision for the Self-Aware Machine", 2013, Published by PARC Blog at http://blogs.parc.conn/2013/12/a-vision-for-the-self-aware-machine/ (Year: 2013).*

"5725-M54 IBM UrbanCode Deploy V6.2", IBM, Feb. 16, 2016, retrieved on Sep. 20, 2016, retrieved from http://www.01.ibm.com/common/ssi/printableversion.wss?docURL=/common/ssi/rep_sm/.., 14pgs.

Shipley, Philip "Demystifying Continuous Integration, Deliver, and Deployment", Codeship, Aug. 10, 2016, retrieved on 9/20/206, retrieved from https://blog.codeship.com/demystifying-continuous-integration-delivery-deployment/, 19pgs.

Raj, Chelliah Pethuru et al., "Use big data and fast data analytics to achieve analytics as a service (AaaS)", Sep. 24, 2015, 13pgs.

International Search Report and Written Opinion issued in connection with corresponding PCT Application No. PCT/US17/056018 dated Jan. 22, 2018.

* cited by examiner

GENERIC DATA DRIVEN MODEL BUILD

```
{
 "modelName" : "testDataDrivenBuild",
 "taskName" : "build",
 "techniqueName" : "SVM",
 "dataSources" : {
    "dataSource1" : "/hostfiles/testdata.csv"
 },
 "inputs" : ["X1" , "X2"]
 "outputs" : ["Y1" , "Y2"]
 "logFile" : "/hostfiles/testModel-build.log",
 "workDir" : "/hostfiles",
 "headerMappings" : {
 "X1" : [ {
 "dataSource1" : "X1"
 }],
 "X2" : [ {
 "dataSource1" : "X2"
 }],
 "Y1" : [ {
 "dataSource1" : "Y1"
 }],
 "Y2" : [ {
 "dataSource1" : "Y2"
 }]

REGISTER NEW TECHNIQUE

TEMPLATES
BUILD
BUILD TEMPLATE
⊕ NEW

BUILD RESULTS TEMPLATE
⊕ NEW

TECHNIQUE TYPE: [CONTAINER ▼]      RUN COMMAND
END POINT

TECHNIQUE NAME                      TECHNIQUE DESCRIPTION
TECHNIQUE-NAME
TECHNIQUE LABEL
TECHNIQUE LABEL
TECHNIQUE VERSION
1.0
TAGS
ADD A TAG
[SAVE]  * PLEASE FILL IN ALL FIELDS

SYSTEM ARCHITECTURE FOR SECURE AND RAPID DEVELOPMENT, DEPLOYMENT AND MANAGEMENT OF ANALYTICS AND SOFTWARE SYSTEMS

CROSS-REFERENCE TO RELATED APPLICATIONS

The present application is related to U.S. patent application Ser. No. 15/338,886, filed Oct. 31, 2016, entitled "Self-Aware and Self-Registering Software & Analytics Platform Components", U.S. patent application Ser. No. 15/338,922, filed Oct. 31, 2016, entitled "Integrated Development Environment for Analytic Authoring", and U.S. patent application Ser. No. 15/338,951, filed Oct. 31, 2016, entitled "Scalable and Secure Analytic Model Integration and Deployment Platform," all of which are hereby incorporated herein by reference in their entirety for all purposes.

BACKGROUND

It is often desirable to make assessment and/or predictions regarding the operation of a real world physical system, such as an electro-mechanical system.

Conventionally, models are used to analyze data and generate results that may be used to make assessments and/or predictions of the physical system. Models may be an important aspect in making industrial systems function efficiently. A model may be built on a local computer and then the model is transmitted to another computer to be executed. However, running the model on a computer different from where it was built may involve re-writing the model program and de-bugging the program, which may be very time consuming and error-prone. This re-writing/de-bugging process may be repeated each time the model is run on another system.

It would therefore be desirable to provide systems and methods to facilitate model construction for a physical system in a more efficient and accurate manner.

BRIEF DESCRIPTION

According to some embodiments, an apparatus includes one or more component models of an analytic model for an installed product; an application programming interface (API) wrapper associated with each of the one or more component models, the API wrapper including information about one or more inputs to the component model; and wherein the component model and the API wrapper form a self-aware component.

According to some embodiments, the method includes providing an installed product; receiving a component model of an analytic model for the installed product; defining an API wrapper associated with the component model, the definition including information about one or more inputs to the component and one or more outputs of the component model; and generating a self-aware component from the component model and the API wrapper.

According to some embodiments, the system includes one or more installed products; a computer processor to: receive a component model of an analytic model for the installed product; receive an application programming interface (API) wrapper associated with each of the one or more component models, the API wrapper including information about one or more inputs to the component model and one or more outputs of the component model, wherein the component model and the API wrapper form a self-aware component; at least one communication channel for supplying one or more inputs to the component model; a memory in communication with the computer processor, the memory storing the component and additional program instructions.

A technical effect of some embodiments of the invention is an improved technique and system for rapid development and deployment of an analytic and software system. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

FIG. 7 illustrates an interface according to some embodiments.

FIG. 9 illustrates an interface according to some embodiments.

DETAILED DESCRIPTION

Figure 1:
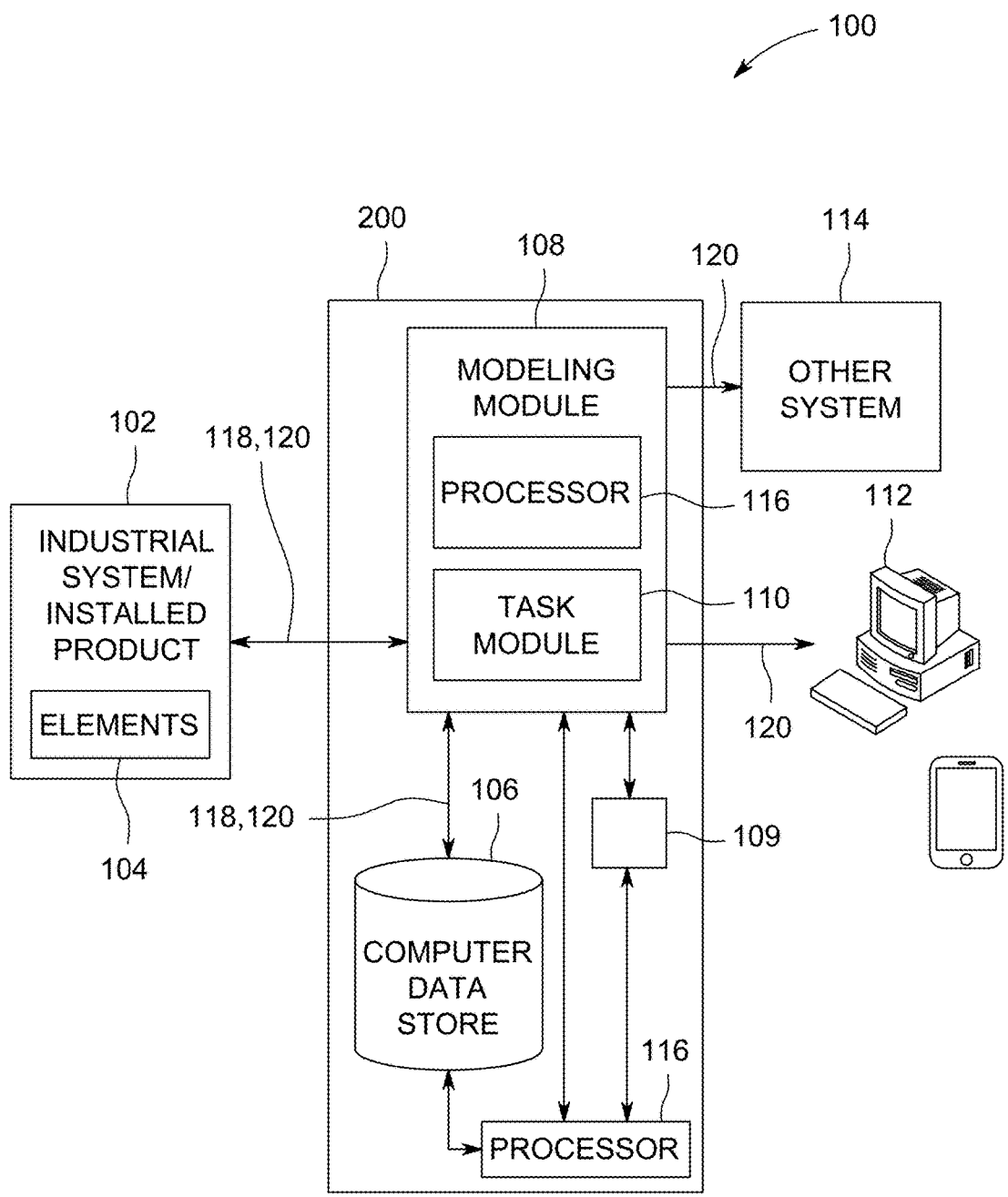
FIG. 1 illustrates a system according to some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

It is often desirable to make assessment and/or predictions regarding the operation of a real world physical system, such as an electro-mechanical system.

Conventionally, computational models are used to analyze data and generate results that may be used to make assessments and/or predictions of the physical system. Models may be an important aspect in making industrial systems function efficiently. A model may be built on a local computer and then the model may be transmitted to another computer for execution. However, running the model on a computer different from where it was built may involve re-writing and/or debugging the model program, which may be very time consuming. This re-writing/de-bugging process may be repeated each time the model is run on another system. Additionally, industrial-grade systems may be complex and may involve hundreds of building blocks to work together seamlessly in production environments. Each block may be managed over its lifecycle to preserve the overall product integrity. As the blocks evolve, it may be difficult to manage the dependencies and handoffs between these blocks. Another challenge with conventional systems may be that not all blocks change at the same time, therefore the blocks may be need to be managed individually, sometimes keeping different versions of the same blocks running in parallel. Building these conventional systems may involve large teams of developers with multiple technical backgrounds to work together to build the system.

An example of a model may be a Remaining Useful Life ("RUL") model that may predict a remaining useful life of an electro-mechanical system, such as an aircraft engine, to help plan when the system should be replaced. Likewise, an owner or operator of a system might want to monitor a condition of the system, or a portion of the system to help make maintenance decisions, budget predictions, etc.

Some embodiments relate to digital twin modeling. "Digital twin" state estimation modeling of industrial apparatus and/or other mechanically operational entities may estimate an RUL of a twinned physical system using sensors, communications, modeling, history and computation. It may provide an answer in a time frame that is useful, that is, meaningfully priori to a projected occurrence of a failure event or suboptimal operation. The information may be provided by a "digital twin" of a twinned physical system. The digital twin may be a computer model that virtually represents the state of an installed product. The digital twin may include a code object with parameters and dimensions of its physical twin's parameters and dimensions that provide measured values, and keeps the values of those parameters and dimensions current by receiving and updating values via outputs from sensors embedded in the physical twin. The digital twin may have respective virtual components that correspond to essentially all physical and operational components of the installed product.

As used herein, references to a "digital twin" should be understood to represent one example of a number of different types of modeling that may be performed in accordance with teachings of this disclosure.

The term "installed product" should be understood to include any sort of mechanically operational entity, including, but not limited to, jet engines, locomotives, gas turbines, and wind farms. The term is most usefully applied to large complex systems with many moving parts and numerous sensors installed in the system. The term "installed" includes integration into physical operations such as the use of engines in an aircraft fleet whose operations are dynamically controlled, a locomotive in connection with railroad operations, or apparatus construction in, or as part of, an operating plant building.

As used herein, the term "automatically" may refer to, for example, actions that may be performed with little or no human interaction.

FIG. 1 is a block diagram of a system 100 provided according to some embodiments. The system 100 may include a plant or "installed product" 102. As noted above, the installed product 102 may be, in various embodiments, a complex mechanical entity such as the production line of a factory, a gas-fired electrical generating plant, a jet engine on an aircraft amongst a fleet, a wind farm, a locomotive, etc. The installed product 102 may include a considerable (or even very large) number of physical elements 104, which for example may include turbine blades, fasteners, rotors, bearings, support members, housings etc., etc.

The system 100 may include a computer data store 106 that provides information to a modeling module 108 and may store results from the modeling module 108. The modeling module 108 may include one or more processing elements 116. The processor 116 may, for example, be a conventional microprocessor, and may operate to control the overall functioning of the modeling module 108.

In one or more embodiments, the data store 106 may comprise any combination of one or more of a hard disk drive, RAM (random access memory), ROM (read only memory), flash memory, etc. The data store 106 may store software that programs the processor 116 and the modeling module 108 to perform functionality as described herein. Data in the data store 106 may also include, for example, information about physical elements 104 of the installed product 102, such as historic engine sensor information about a number of different aircraft engines and prior aircraft flights (e.g., external temperatures, exhaust gas temperatures, engine model numbers, takeoff and landing airports, etc.).

The modeling module 108, according to some embodiments, may access the data store 106 and utilize a model creation unit or task module 110 to create a predictive or analytic model that may be used to create a prediction and/or result that may be transmitted to at least one of various user platforms 112, back to the installed product 102 or to other systems 114, as appropriate (e.g., for display to a user, operation of the installed product, operation of another system, or input to another system).

The modeling module 108 may be programmed with one or more software components that may model individual elements 104 that make up the installed product 102.

A communication channel 118 may be included in the system 100 to supply data from at least one of the installed product 102 and the data store 106 to the modeling module 108.

In some embodiments, the system 100 may also include a communication channel 120 to supply output from one or more models in the modeling module 108 to at least one of user platforms 112, back to the installed product 102, or to other systems 114. In some embodiments, signals received by the user platform 112, installed product 102 and other systems 114 may cause modification in the state or condition or another attribute of one or more physical elements 104 of the installed product 102.

Although not separately shown in the drawing, one or more control units, processors, computers or the like may be included in the installed product 102 to control operation of the installed product 102, with or without input to the control units, etc., from the modeling module 108.

As used herein, devices, including those associated with the system 100 and any other devices described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

A user may access the system 100 via one of the user platforms 112 (e.g., a personal computer, tablet, or smartphone) to view information about and/or manage an installed product 102 and/or develop models in accordance with any of the embodiments described herein. According to some embodiments, an interactive graphical display interface may let an operator develop models, define and/or adjust certain parameters and/or provide or receive automatically generated recommendations or results.

Figure 2:
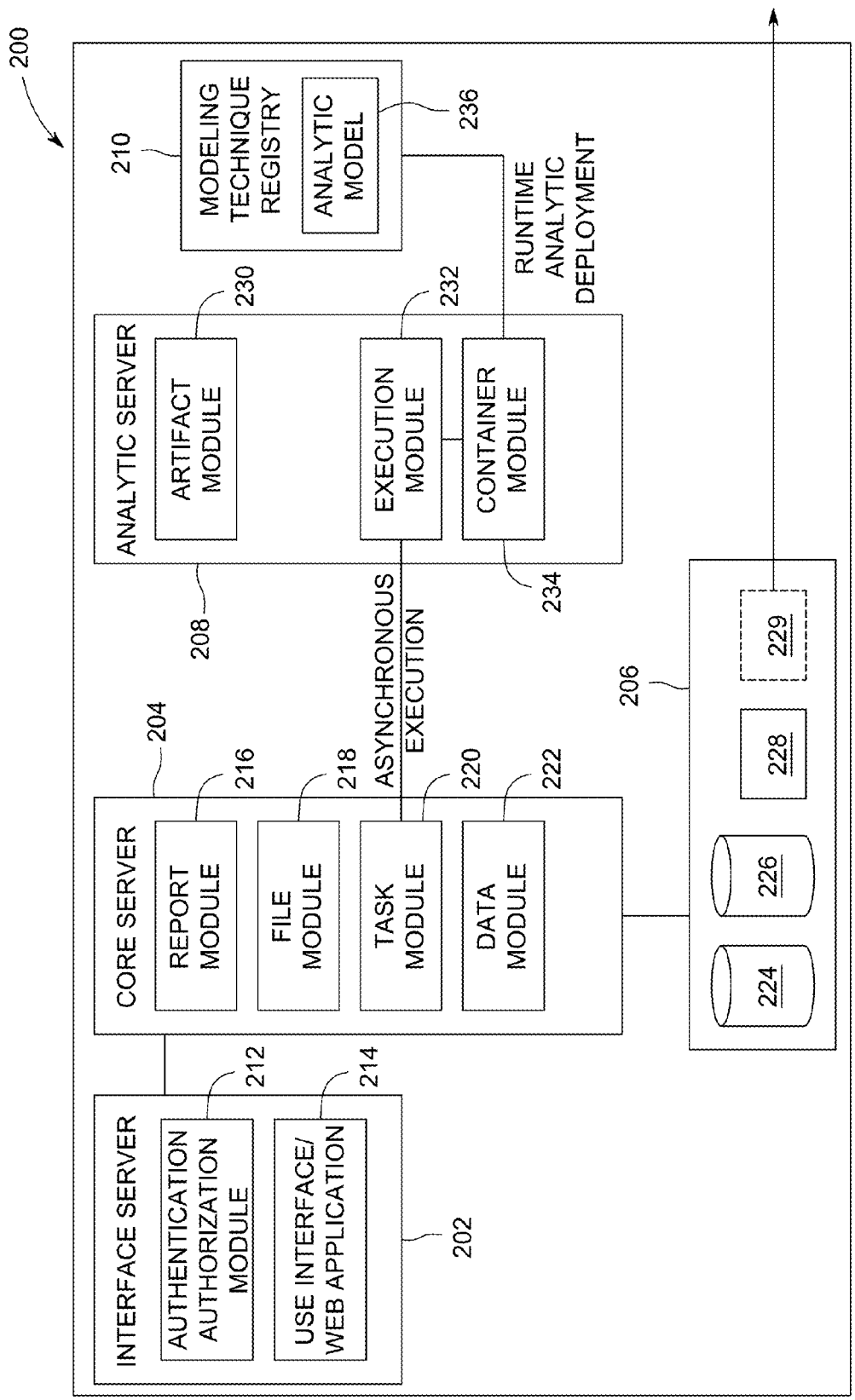
FIG. 2 illustrates a system architecture according to some embodiments.

Turning to FIG. 2, a high-level architecture 200 of the system 100 is provided, in accordance with some embodiments. In some embodiments, the platform 200 may include an interface server 202, a core server 204, storage 206, an analytic server 208, and a modeling technique registry 210.

In some embodiments, the interface server 202 may include an authentication/authorization module 212. The authentication/authorization module 212 may be programmed to authenticate a model developer and authorize the model developer to develop and execute models for the system 100. In some embodiments, the authentication module 212, in conjunction with application specific access controls, may be used to control both access to the system (authentication) and operations a user may be allowed to perform within the system (authorization). The interface server 202 may also include an interactive graphical user interface display 214 (e.g., web application) according to some embodiments. The display 214 may include an area 502 (FIG. 5) to develop models, as described herein. In some embodiments, within the platform 200, one or more interface servers 202 are coupled to, and may provide programmatic or web interfaces 214 to one or more core server(s) 204.

In one or more embodiments, the core server 204 may host one or more applications or modules (e.g., Report Module 216, File Module 218, Task Module 220, and Data Module 222). In some embodiments, the applications or modules may be micro-services. In one or more embodiments, the Report Module 216 may allow specific reports to be retrieved from the storage 206. In one or more embodiments, the Task Module 220 may be a task manager, and may start/stop/get the status of any model-related task. In one or more embodiments, the Task Module 220 may: prepare an input file for analysis; trigger the execution module to run the analytic; update the task status; parse the analytic output and register the input and output artifacts with a database. In one or more embodiments, the Data Module 222 may provide access to various specific persistent storage elements. The core server 204 is, in turn, shown to be coupled to one or more memories/storage elements 206. In one or more embodiments, the storage element 206 may be a persistent storage. In one or more embodiments, the storage element 206 may be an external storage element. The storage element 206 may include at least one of one or more relational databases (e.g., SQL store) 224, one or more NoSQL or non-relational data stores (e.g., NoSQL stores) 226, and one or more Binary Large OBject (BLOB) Stores 228. In one or more embodiments, the non-relational data store 226 may include one or more data tables that may index component 310 metadata for facilitating searching and accessing via the model. In one or more embodiments, the storage element 206 may include an interface 229, which may be used to communicate with an element outside of the platform 200. In some embodiments, the system 100 may be extended to use storage elements 206 like Hadoop, Time Series, Triple store, and other suitable storage elements.

In some embodiments, the analytic server 208 may host an artifact module 230, an execution module 232 and a container module 234.

In some embodiments, the tasks or models developed in the task module 220 may be executed by the execution module 232. In one or more embodiments, this execution may be remote. In some embodiments, the execution module 232 may: execute arbitrary shell commands on a host operating system; invoke a Docker-based analytic (or any other suitable analytic) when the shell command is a bash script; be secured with HTTPS client certificate authentication; send execution status updates to the task module 220.

Figure 12:
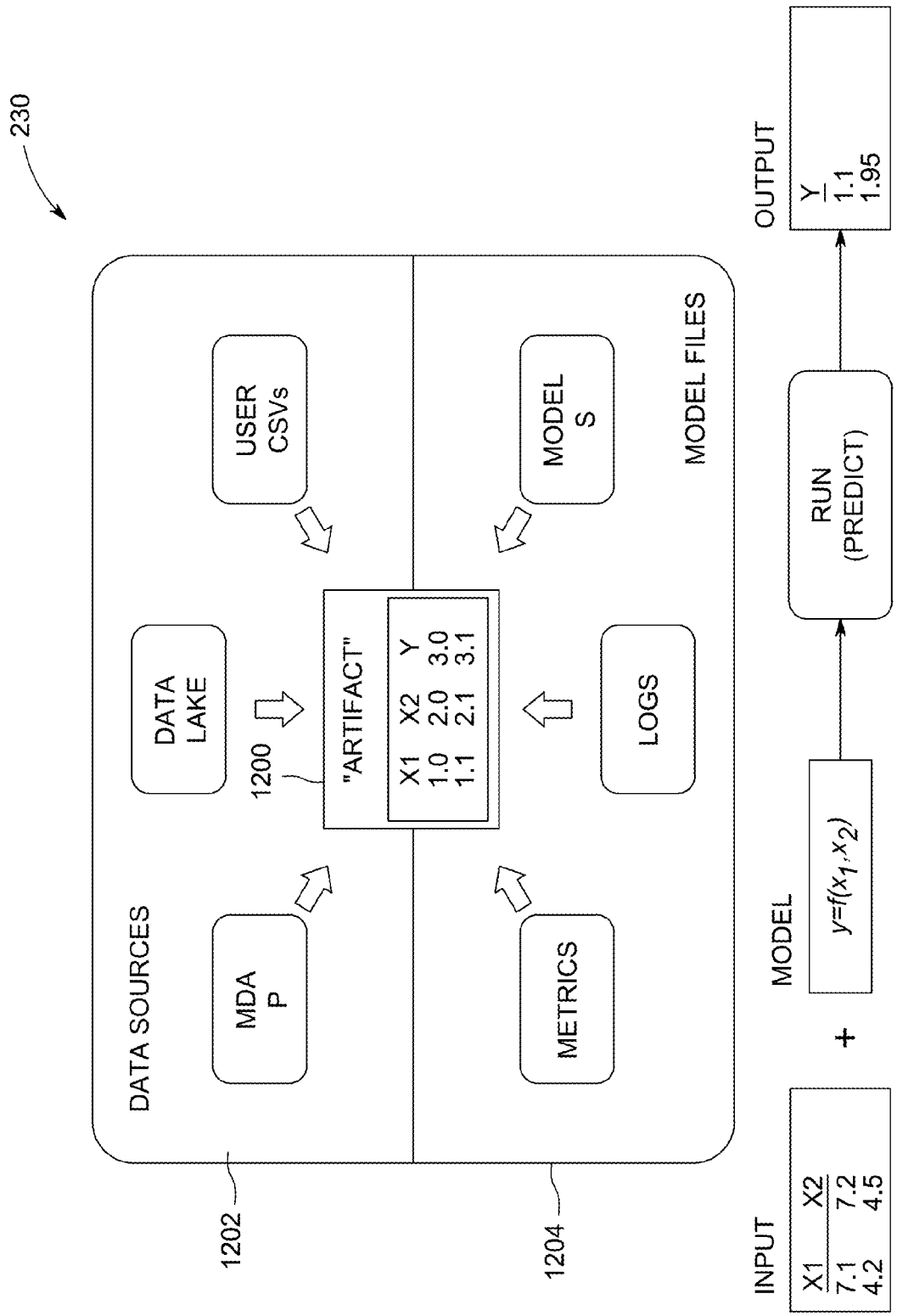
FIG. 12 illustrates a block diagram of the artifact module according to some embodiments.
Figure 13:
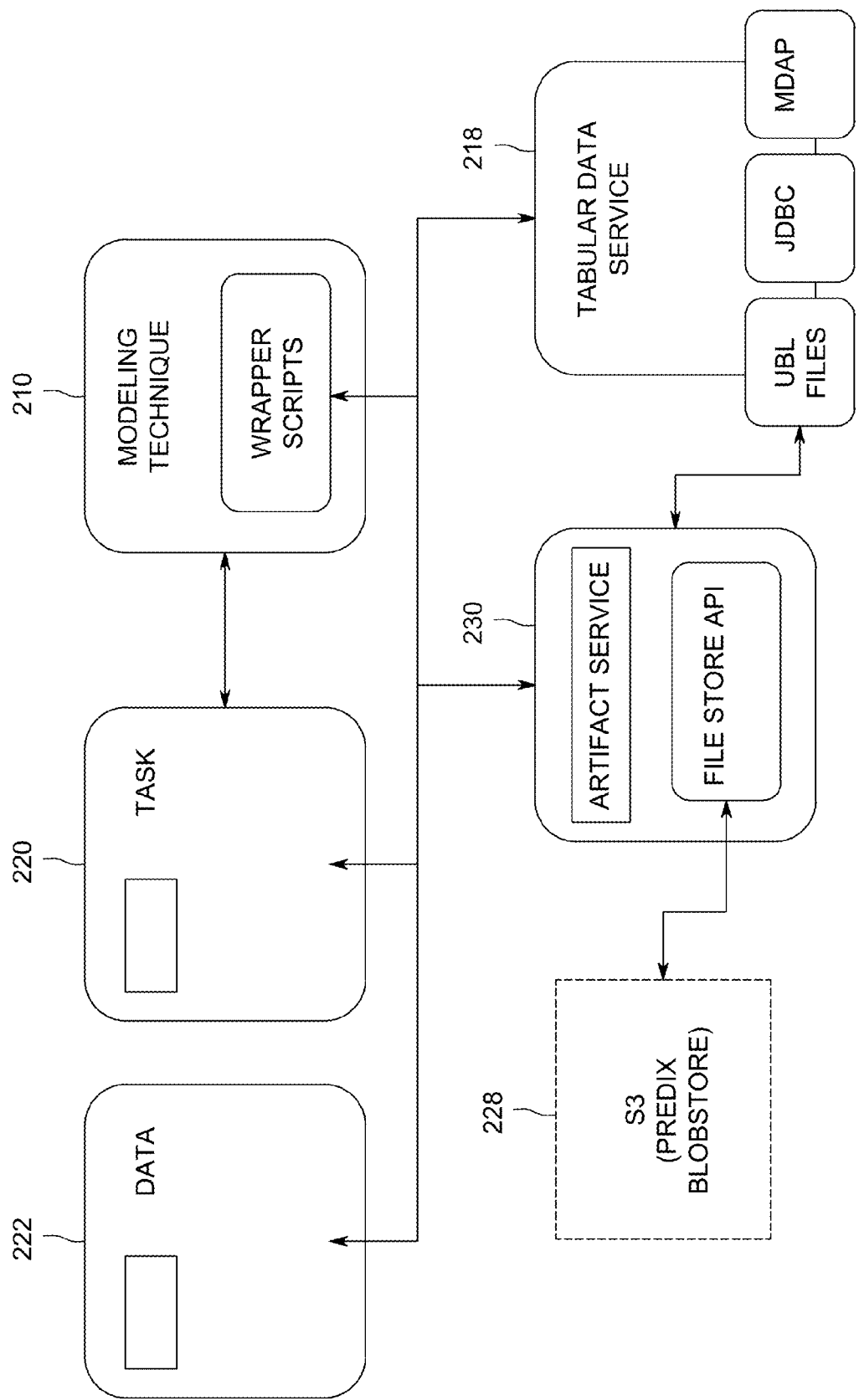
FIG. 13 illustrates a block diagram of the system according to some embodiments.

In one or more embodiments, the artifact module 230 may be a distributed service for provisioning, collecting, extracting and the persistence of artifacts required or produced by execution of model tasks. An artifact 1200 may be any piece of electronic data that is stored in some sort of file (e.g., text, binary, numbers, logs, a compiled executable, etc.). As shown in FIG. 12, data sources 1202 (e.g., MDAP, Data Lake, User CSVs) as well as model files 1204 (e.g., metrics, logs, input information, models, output information) may have data that may be indexed by the artifact module 230. In one or more embodiments, the model may have information indexed by the artifact module 230 as the coefficients of the model may be stored elsewhere. In one or more embodiments, as shown in FIG. 13, the artifact module 230 may receive artifacts from the BLOB store 228, the data module 222, the task module 220, the file module 218 and the modeling technique registry 210, and may transport the artifacts to any of the BLOB store 228, the data module 222, the task module 220, the file module 218 and the modeling technique registry 210. In one or more embodiments, the artifact module 230 may: fetch input artifacts and store them as files on temporary file storage, accessible by the modeling technique to run the model; upload artifacts output by the model to the artifact module 230; and run from bash shell scripts invoked by the execution module 232. Prior to execution, the artifact module 230 may provision the necessary artifacts in a temporary locally accessible path to allow the models, and other software, to run the same in a local development environment and a production or execution environment. In one or more embodiments, when the model developer develops a model, the model developer may use locally stored data and other files/artifacts. By providing all necessary data files and other artifacts locally, the Artifact Module 230 may allow the model to execute the same way in the production environment as when it was being developed in the development environment. In some embodiments, when the software completes its task, the Artifact module 239 may also be responsible for collecting the produced artifacts from the temporary workspace (not shown) and persisting them in permanent storage 206.

In some embodiments, the execution module 232 may turn any model (e.g. computational operation or shell command) into a Representational State Transfer (REST) web service. REST web services may refer to an architectural style and communication approach that may be easy to consume by other applications via their web Application Programming Interface (API). In one or more embodiments, turning a model into a web service may be described as publishing the model in the form of a REST end point. The REST end point form may make the model easy to use by other services or applications (e.g., in a cloud environment). In one or more embodiments, the platform 200 may include a log module (not shown) that may store log entries into a triple store when invoked via the REST. In some embodiments, the transmission of the model from the task module 220 to the execution module 232 may be asynchronously executed. As used herein in this regard, "asynchronous execution" means that the requesting module is not waiting for the task to be completed by the execution model 232. Instead, in some embodiments, the requesting module sends a request, specifying a call-back end point where the requesting module wants to receive information when there is an update about the status of the task. For example, in some embodiments, the requesting module may effectively say to the execution module "do this task (x) and call me back at the following address (y) when you are done."

In one or more embodiments, as will be further described below, the execution module 232 may execute at least one task. Some examples of tasks that the execution module may execute are the following: building a model, predictions using a model, estimating missing data, generating space filling designs etc. In one or more embodiments, the execution module 232 may execute the tasks locally and externally. For example, in some instances, tasks may be local to the execution module 232 and the work may happen locally (e.g., a local small model build or a model prediction), however in other instances the task may require the job to be run elsewhere (e.g., a massively parallel Hadoop instance or a High Performance Computing (HPC) environment like CRAY).

The output (e.g., results/prediction) of the execution module 232 may be received by the container module 234 in some embodiments. In some embodiments the container module 234 may wrap at least one of the one or more model components of an analytic model and the analytic model itself in a complete filesystem that may contain everything needed to run the model (e.g., code, runtime, system tools, system libraries, and anything that may be installed on a server). The inventors note that containerizing the model may allow the model to run the same, regardless of the environment; and may also allow the components of the model, and the model itself, to run independently such that if one component of the model fails, the whole model does not fail. The inventors further note that containerization may also contribute to resilience toward failures of the underlying infrastructure. For example, if the hardware (physical or virtual) that the container is running on fails while the task is being executed, the system may restart the same container on a different computer node to allow the task to complete. While Docker containers may be described herein, any other suitable containers may be used (e.g., springboot, cloud foundry, Kubernetes, etc.).

In one or more embodiments, when the analytic model is executed (e.g., runtime analytic deployment), a containerized model 236 may be registered and stored in the modeling technique registry 210. In response to deployment, in some embodiments, the modeling technique registry 210 may register the new containerized model 236 in the system 100.

Figure 3A:
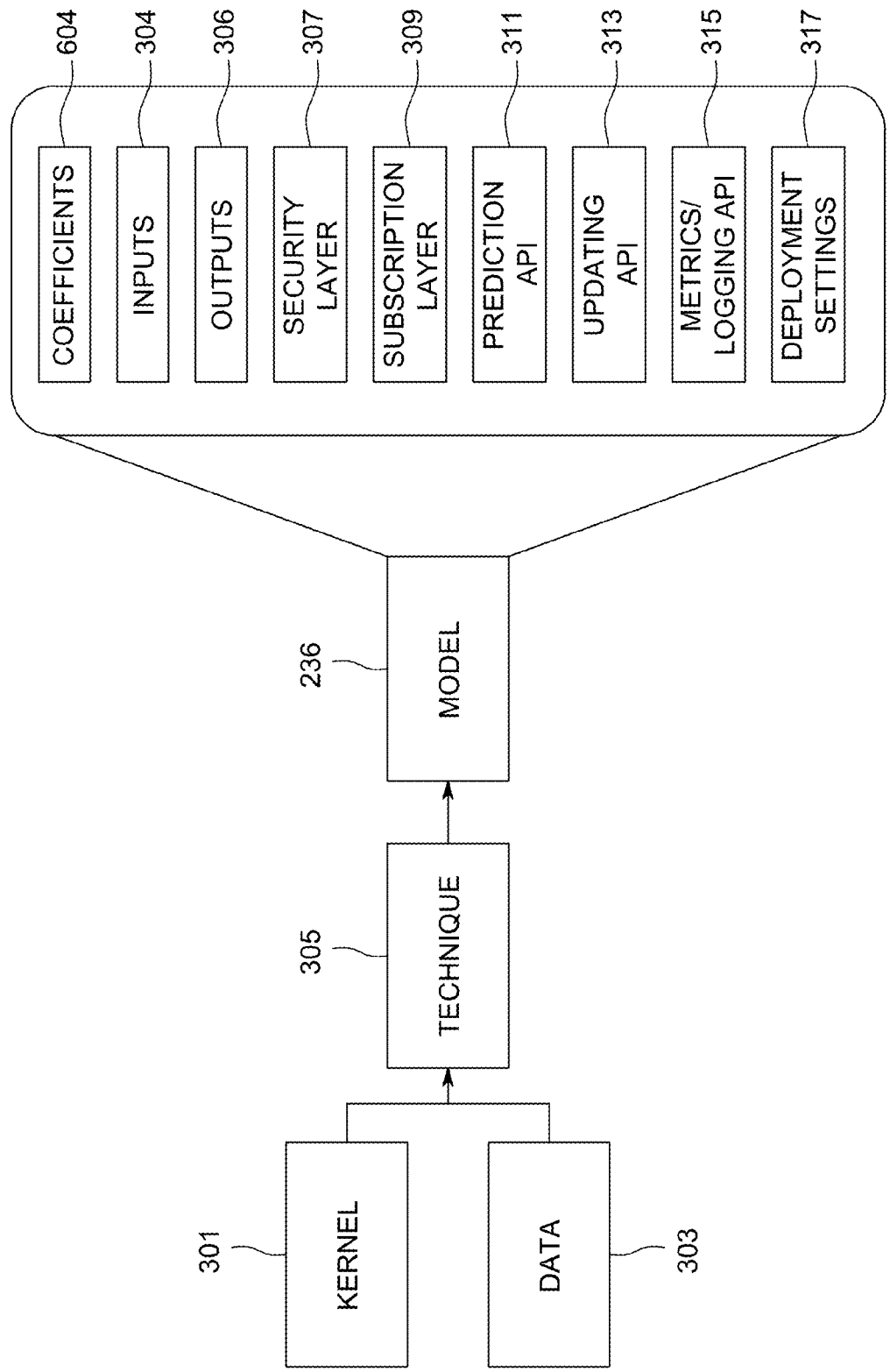
FIGS. 3A and 3B illustrates a component according to some embodiments.
Figure 3B:
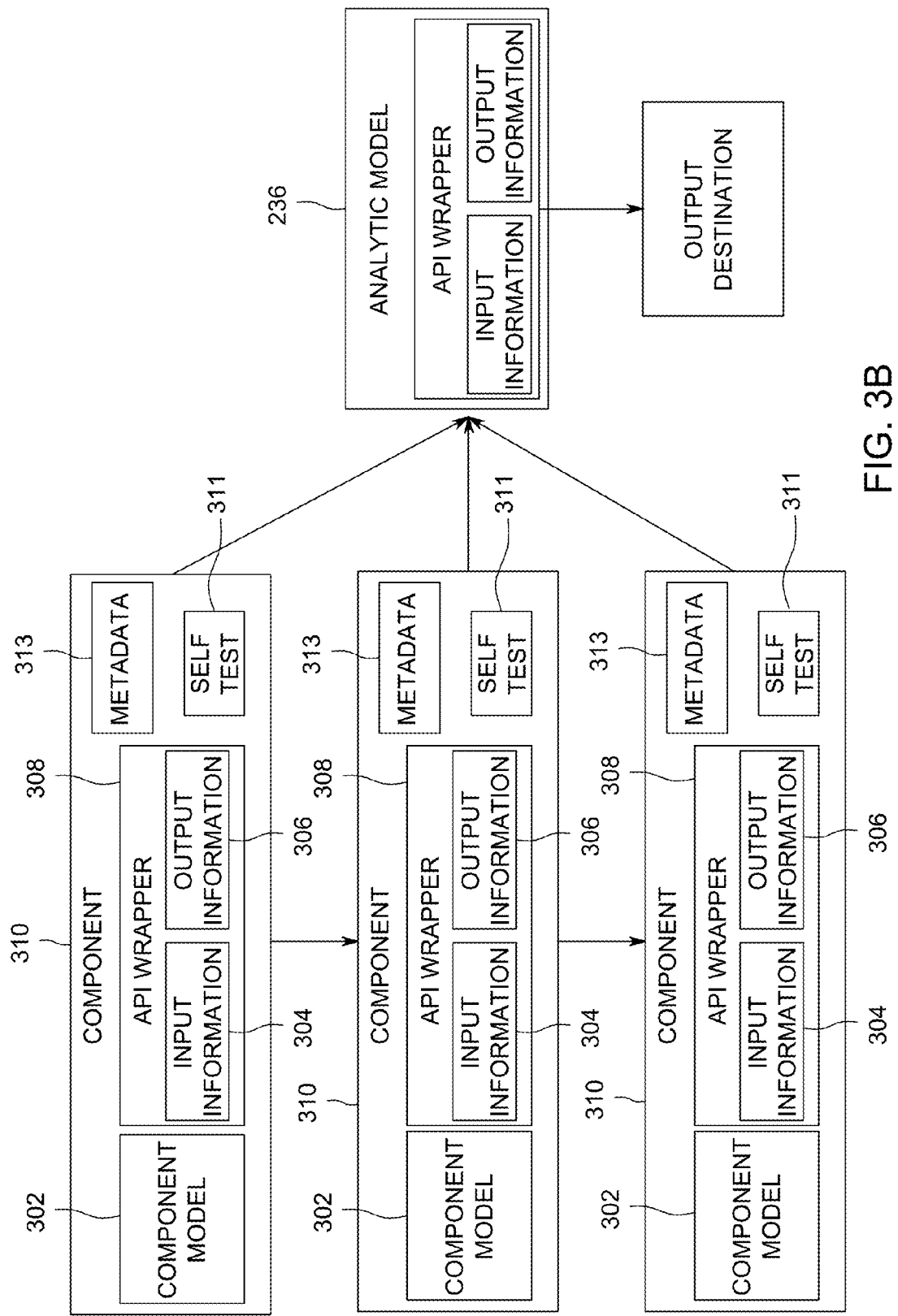

An example of analytic model 236 according to some embodiments is illustrated in FIGS. 3A and 3B. In one or more embodiments, the model developer may use the user interface/web application 214 to develop the model 236. Development of the model 236 may include a kernel 301 (e.g., a building block of models). The kernel 301 may be the functional form of a model with generic coefficients. For example, $y=a*x+b$ is a kernel 301 with coefficients a and b; and $T_{metal}=N*(T_{hot}-T_{cold})$ is a kernel with coefficient N. In one or more embodiments, the kernel 301 and data 303 may be received by a technique 305. In one or more embodiments, data may typically come from operationally measured variables, observed damage states during inspection, remote monitoring and diagnostics etc. In one or more embodiments, the technique 305 may be a solution methodology, in general. In one or more embodiments, with respect to a module build or update, the technique 305 may be the "method" that generates the specific values of the coefficients in the kernel. For example, Regression, ANN and PCE, etc. may be several techniques for building data-driven models; EKF, UKF, Particle filters, Bayesian updating, etc. may be model updating techniques; BEST analysis, Area metric, etc. may be data comparison techniques; and OLH, RLH, CCD etc. may be DOE generation techniques. In one or more embodiments, the model 236 may codify a relationship between inputs and outputs. The model 236 may be developed from one or more kernels by estimating the values of coefficients in the Kernels 301, through a technique 305, to fit data. In one or more embodiments, the model 236 may be a fully specified mathematical representation of the relationship between the inputs and outputs. For example, the coefficients in the kernel $y=a*x+b$ may be estimated through Bayesian estimation to form a model $y=1.2*x+0.5$ In some embodiments, the model 236 may include coefficients 604 (FIG. 6), inputs 304, outputs 306, a security layer 307, a subscription layer 309, a prediction API 311, an updating API 313, a metrics/logging API 315, and a deployment settings 317.

In one or more embodiments, the security layer 307 may secure the model 236 at all levels; and may allow segmented access to different parts of the model 236. For example, users may have the ability to use the model 236 without having any access to coefficients.

In one or more embodiments, the subscription layer 309 may allow the use of the models 236 for a specified number of uses or for a specified amount of time. In some embodiments, the subscription layer may enable renewals to use of the model, and may provide for self-destruction of the model after a limited use.

In one or more embodiments, the prediction API 311 may provide the capability to make predictions using the model 236. In some embodiments, the prediction API 311 may be combined with security 307 and the subscription layer 309 to define what predictions are enabled. For example, if a model is $y=a*x+b*z+c*w$, the prediction API may be set such that the user only sees the following: 1. $Y=f(x)$ where the user may only enter values for x; and/or 2. $Y=a*x+c*w+g(\ldots)$ where the user may see there are two inputs, x and w, with specific coefficients, etc.

In one or more embodiments, the updating API 313 may provide the capability to update the model 236 with new data. In some embodiments, the updating API 313 may be combined with security 307 and subscription layers 309 to define what updates may be enabled, similar to the prediction API.

In one or more embodiments, the metrics/logging API 315 may provide metrics of the model 236 as newer predictions are made (i.e., as new inputs are provided to the model for predictions). In some embodiments, logging of actions may be provided as the model is used for any purpose.

In one or more embodiments, the deployment settings 317 may allow the model 236 to be deployed in a variety of systems. For example, the same model may be deployed on an edge device and on a high performance computing infrastructure. Based on the deployment settings, the model 236 may decide whether it runs fast (e.g., because of reduced computations resources on the edge) or run in full mode. Depending on the settings, different security and subscription settings 307, 309 may be automatically triggered. In some embodiments, this may enable model flexibility and may allow the model to self-optimize to specific environments and requirements.

In one or more embodiments, the analytic model 236 may include one or more functional components 302 (FIG. 3B), hereinafter referred to as "component models". In some embodiments, each component model 302 may represent a different function or task that may be executed as part of the execution of the analytic model 236.

For example, each of data ingestion, data cleaning and executing the analytic may be component models. Other suitable component models may be used. In one or more embodiments, each of the component models 302 may be independent and complete by itself and may not need to be part of a system.

In one or more embodiments, each of the component models 302 may know what its inputs are and what its outputs are. For example, if the component model is y=a*x+b, the component model 302 may know that "x" is the input, "a,b" are the coefficients and "y" is the output. The component model 302 may also know where input is coming from (e.g., one or more sources) and where the output is going (e.g., one or more destinations). In some embodiments, the source may be a file, a data stream, a data warehouse, a user and a database. Other suitable data sources may be used. In one or more embodiments, the input and output may be in a JSON format or any other suitable format. The inventors note that while standardized inputs and outputs in any form that may be applicable to programming languages may be used, the use of a JSON format may be beneficial as it is a standard that may be supported by many programming languages and it may allow representation of all required and optional information needed for the running of any model. JSON format may also be flexible by allowing new information to be added without having to change the underlying software. In one or more embodiments, there may be more than one output. In some embodiments, at least one output may be a JSON file, while the other outputs may be other file types. In one or more embodiments, the one JSON output is what the system may expect in order to collect information regarding the outcome of the task. Again due to the generality of the JSON format, different models may include model-specific information in the JSON document. Any markup language may also be used. Many types of outputs (which may be used as inputs in some aspects) may also be generated such as binary formats such as Matlab .mat files, Python pickle files etc. Other suitable formats may be used.

In one or more embodiments, input information 304 (e.g., the input and source of the input) and output information 306 (e.g., output and destination) may be stored in, or encoded by, an application programming interface (API) wrapper 308 that may be associated with the component model 302. In some embodiments, the API wrapper 308 may be associated with the component model 302 per the definition of the API. In some embodiments, the API may include standard elements (e.g., input information, modeling technique, output information). In one or more embodiments, the API may include the modeling technique/the process to create a model. In one or more embodiments, the API may define the model, but the model may be completed with its elements that are outside the API (e.g., coefficients and terms). In one or more embodiments, the API may include other suitable standard elements. Together, the component model 302 and the API wrapper 308 may form a component 310. In one or more embodiments, the platform (e.g., system architecture) 200 may not accept the component 310 unless the standard elements (e.g., input information, modeling technique, output information) of the API are defined. In one or more embodiments, the component model's 302 ability to know the inputs, the source of the inputs, the outputs and the destination of the outputs via the API wrapper 308 makes the component 310 "self-aware." In one or more embodiments, metadata 313 for the component 310 may be stored in the component 310 when the component is running. In some embodiments, for the component 310 to be self-aware, the component may also pull metadata 313 from the storage element 206 (e.g., non-relational data stores 226). In some embodiments, since the component 310 knows what its inputs should be and their source, the component 310 may pull the inputs from the sources, as needed.

Conventionally, models may not know what data they will receive or the source of the data, and the models also may not know where the output of the model is going. Rather, conventionally, each time the model is executed, the input, source, and output destination may be specified, which may be time-consuming and error-prone, as a user may not be sure what information to specify. The inventors note that in embodiments, the component 310 defines the input information and output information as part of the component 310 package, facilitating deployment and management of the model 236. In some embodiments, for a model developer to make use of the model 236 (and the associated components 310), the input information 304 and output information 306 may be defined prior to use.

In one or more embodiments, the component 310 may include an integrated self-test 311. The self-test 311 may help maintain the health of the system, and may also facilitate integrating new modeling techniques in the system. In one or more embodiments, the self-test 311 may allow the models to check themselves periodically with new and existing datasets and trigger corrective actions to update the model if the model quality deviates beyond defined thresholds.

In one or more embodiments, the component 310 may also be "self-registering". As used herein, "self-registering" means that the component 310 may provide information about its contents, working rules and capabilities via emission of a unique signature (e.g., via the API wrapper 308) to register itself in any system with valid interface and security settings. A benefit of "self-registering," is that the component 310 may communicate with another component, model, or system, for example, about what information it may need and what information it may provide. In some embodiments, the one or more components 310 may communicate with each other via the API wrapper, because they include the same API wrapper structure (input, model, output), and the API wrapper structure includes instructions about the destination of the output.

In one or more embodiments, each component 310 may be self-aware, and then the self-aware components may form a self-aware analytic model 236, which may, in turn, be combined with other models to form a bigger model and system. In some embodiments, each of the one or more components 310 (e.g., a plug-in, add-in or macro) may add a specific service or feature to a larger model.

Figure 4:
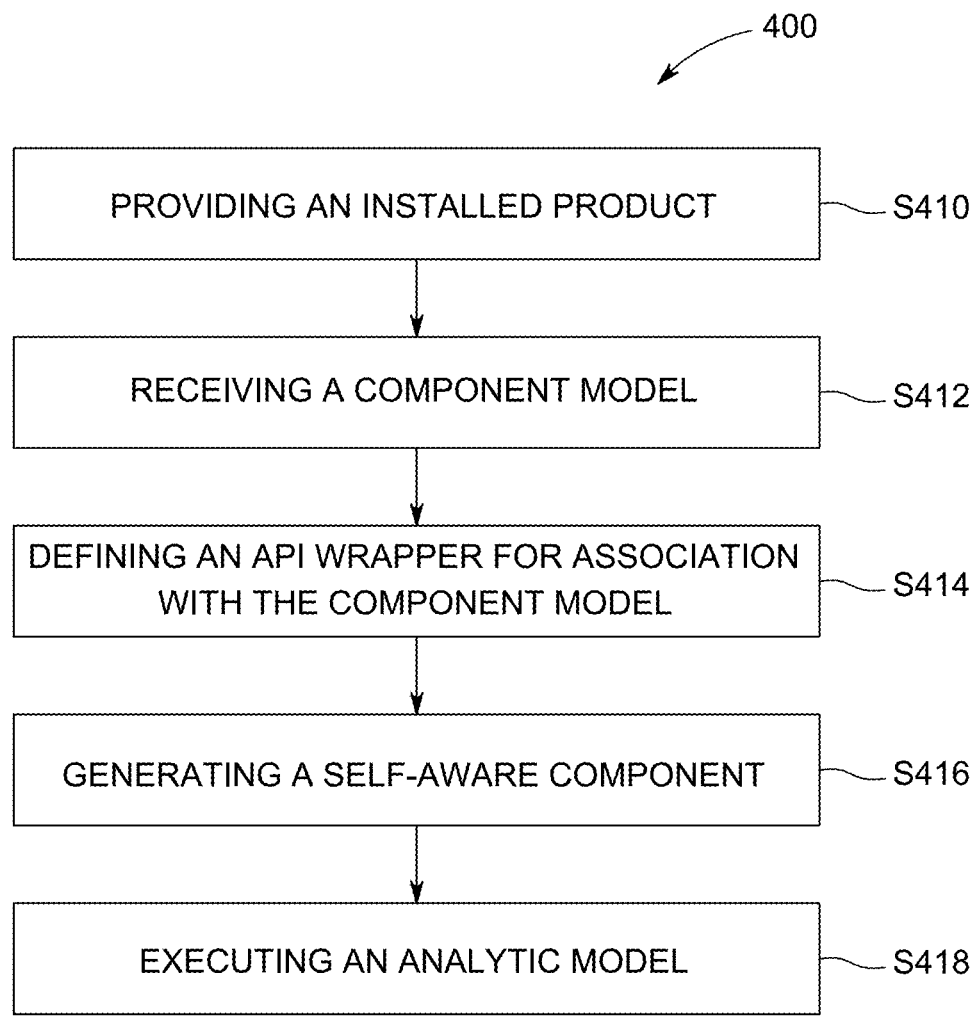
FIG. 4 illustrates a flow diagram according to some embodiments.

FIG. 4 illustrates a process of operation 400 that may be performed by some or all of the elements of the system 100 and platform 200 described with respect to FIGS. 1 and 2. Process 400 and other processes described herein may be performed using any suitable combination of hardware (e.g., circuit(s)), software or manual means. For example, a computer-readable storage medium may store thereon instructions that when executed by a machine result in performance according to any of the embodiments described herein. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. In one or more embodiments, the system 100 is conditioned to perform the process 400 such that the system is a special-purpose element configured to perform operations not performable by a general-purpose computer or device. The flow charts described herein do not imply a fixed order to the steps and embodiments of the present invention may be practiced in any order that is practicable.

Figure 5:
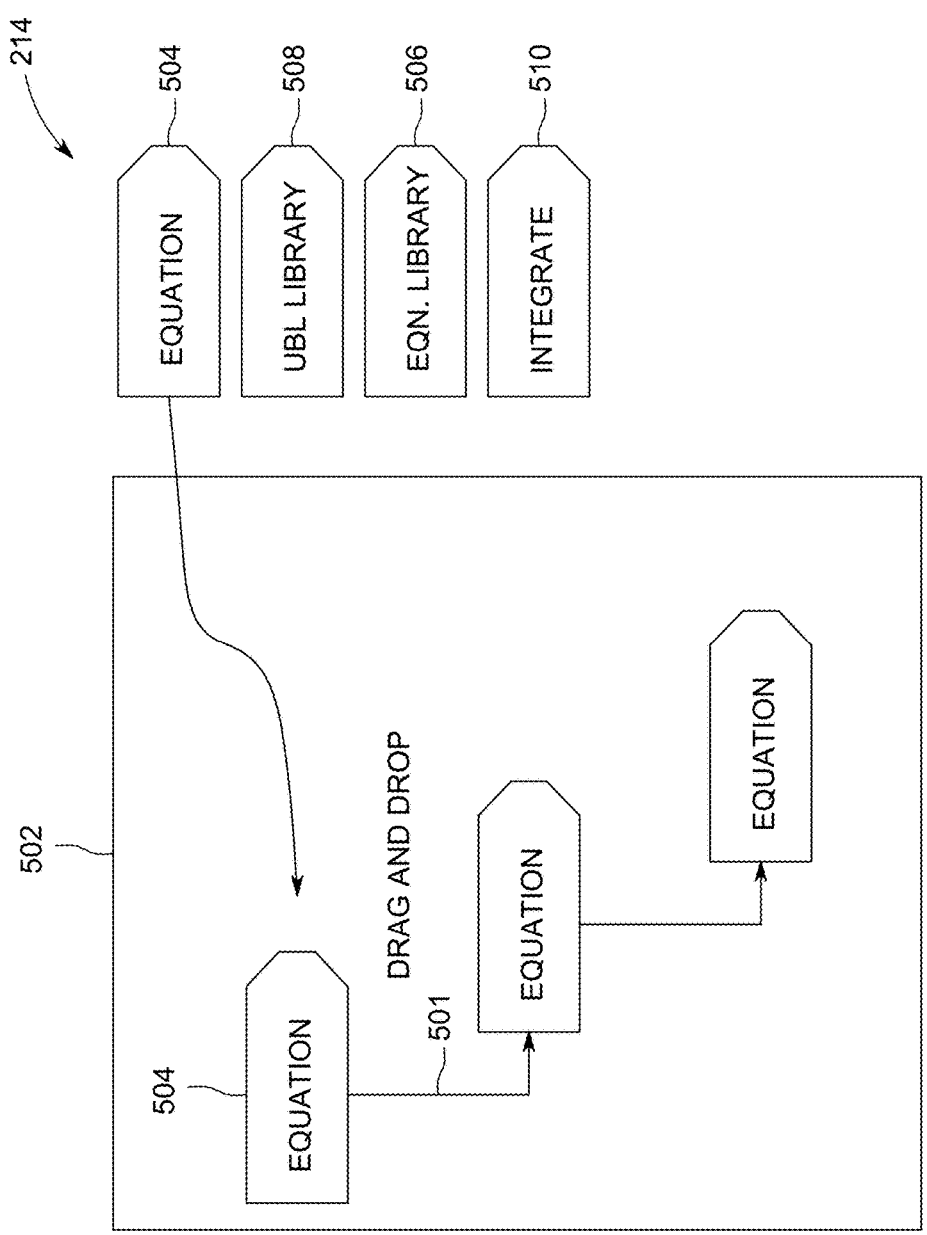
FIG. 5 illustrates an interface according to some embodiments.

Initially, at S410, an installed product is provided. Then in S412, a component model 302 may be received or developed at a modeling module 108 of the core server 204. In one or more embodiments, the task module 110/220 may be used by at least one model developer to develop component models and then ultimately the analytic model 236. For example, FIG. 5 provides the interface 214 with the area 502 to develop the models. The model may include equations 504 inserted (e.g., via drag and drop functionality) from an equation library 506, or developed by the model developer without the use of the equation library 506. In developing the model, the model developer may use other suitable libraries 508 (e.g., Usage Based Lifing library, Scipy library, KDL Sparklgraph library, etc. After the model developer has included the desired equations in the area 502, and linked them as desired 501, the model developer may select an integrate tab 510 to integrate the model with at least one of other models (e.g., other component models, the bigger analytic model) or the system.

As used herein, the component model is the action or task to perform with received inputs. For example, a task of a data ingestion component model may be to funnel data to a next component; and a task of a data cleaning component model may be to clean the input data (e.g., remove noise, determine if any data is missing, check for anomalies).

Figure 6:
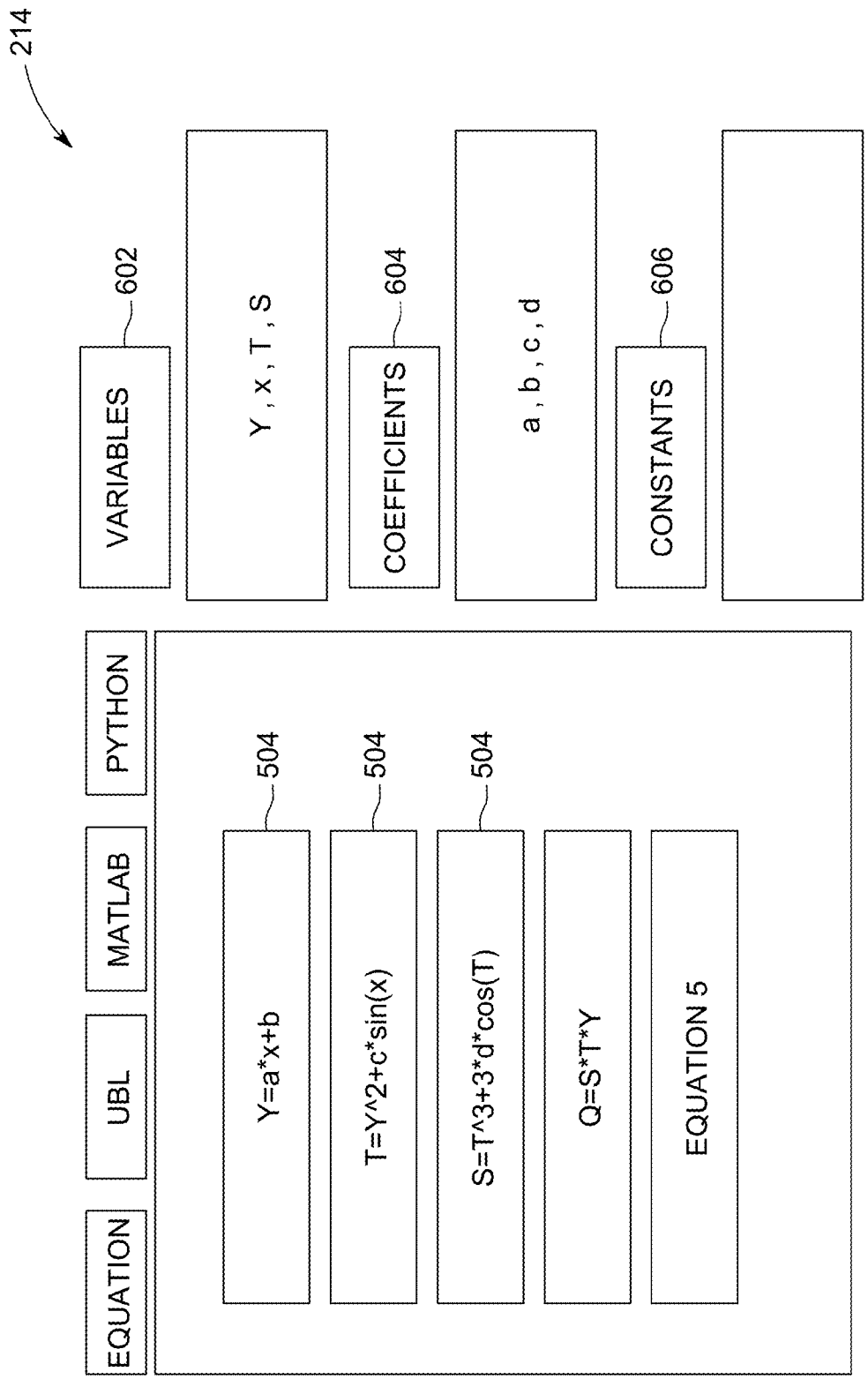
FIG. 6 illustrates an interface according to some embodiments.

Then at S414, an API wrapper 308 is defined for association with the component model 302. For example, FIG. 6 provides the interface 214 for the model developer to define the API wrapper. In one or more embodiments, the container module 234 may be executed to define the API wrapper 308. As described above, the API wrapper 308 may include input information 304 and output information 306. In one or more embodiments, the model developer may also define coefficients 604 and constants 606. In one or more embodiments, the model developer may link each variable 602 to a data header (not shown) in the code. For example, in FIG. 7, the input information lists "X1" and "X2" as the inputs, and the source of "X1" and "X2" is "dataSource1." Additionally, inside "dataSource1," "X1" is referred to as "X1." The output information lists "Y1" and "Y2" as the outputs, and the destination of "Y1" and "Y2" is "dataSource1." Inside "dataSource1," "Y1" is referred to as "Y1" and "Y2" is referred to as "Y2." All inputs needed by the model may be completely defined by the input API. Other suitable notation may be used.

Continuing with the data cleaning component example described above, the input source may be defined as the data ingestion component, and the input for the data cleaning component may be defined as the output of the data ingestion component. Similarly, the output destination of the data cleaning component may be defined as the analytic model 236, and the output of the data cleaning component may be defined to be the results of execution of the data cleaning component model.

Then at S416, a self-aware component is generated. In one or more embodiments, the modeling module 108 may, via the analytic server 208, associate the component model 302 with the API wrapper 308, as defined by the API wrapper, to form the component 310.

Figure 8:
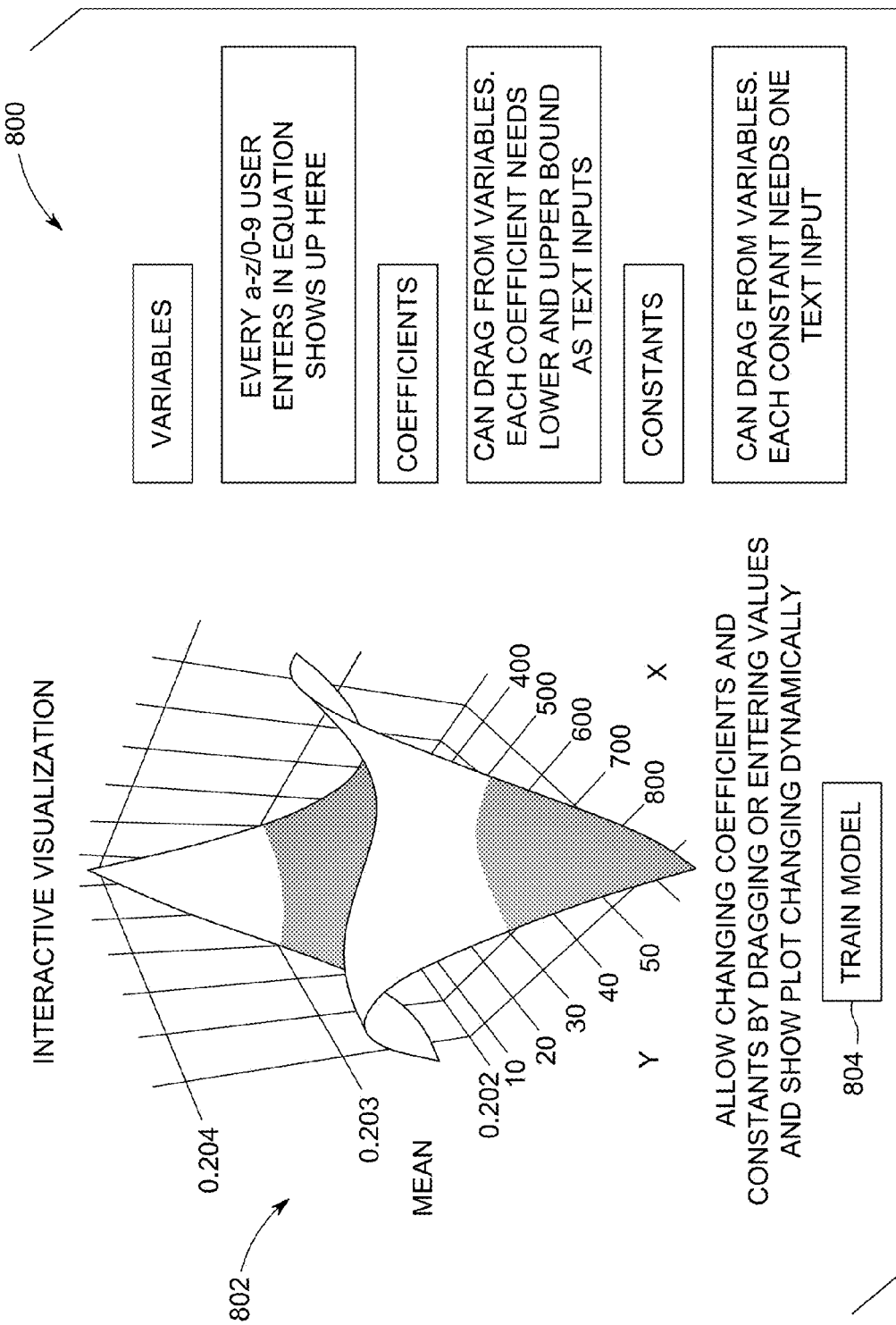
FIG. 8 illustrates an interface according to some embodiments.

In one or more embodiments, an interactive visualization 800 (FIG. 8) of the component 310 may be provided in a user interface. In one or more embodiments, the interactive visualization 800 may be generated after providing the equations 504 and defining the input information 304 and output information 306. In one or more embodiments all of the information entered in the equation 504 may be included in the interactive visualization. In one or more embodiments, the model developer may dynamically change the plot 802 to see how the changes affect the results. For example, in one or more embodiments, the model developer may change the coefficient and constants by dragging them from the variables 602 or entering values. In one or more embodiments, each coefficient 604 may have an upper and lower bound as text inputs. In one or more embodiment, each constant 606 may have at least one text input. In one or more embodiments, after the model developer is satisfied with the model, per the interactive visualization 800, the model developer may select a "train model" indicator 804. While a button indicator is used to select "train model," any other suitable indicator may be used. After selection of the "train model" indicator, the system 100 may then train the component (e.g., compute the value of each coefficient 604).

Figure 10:
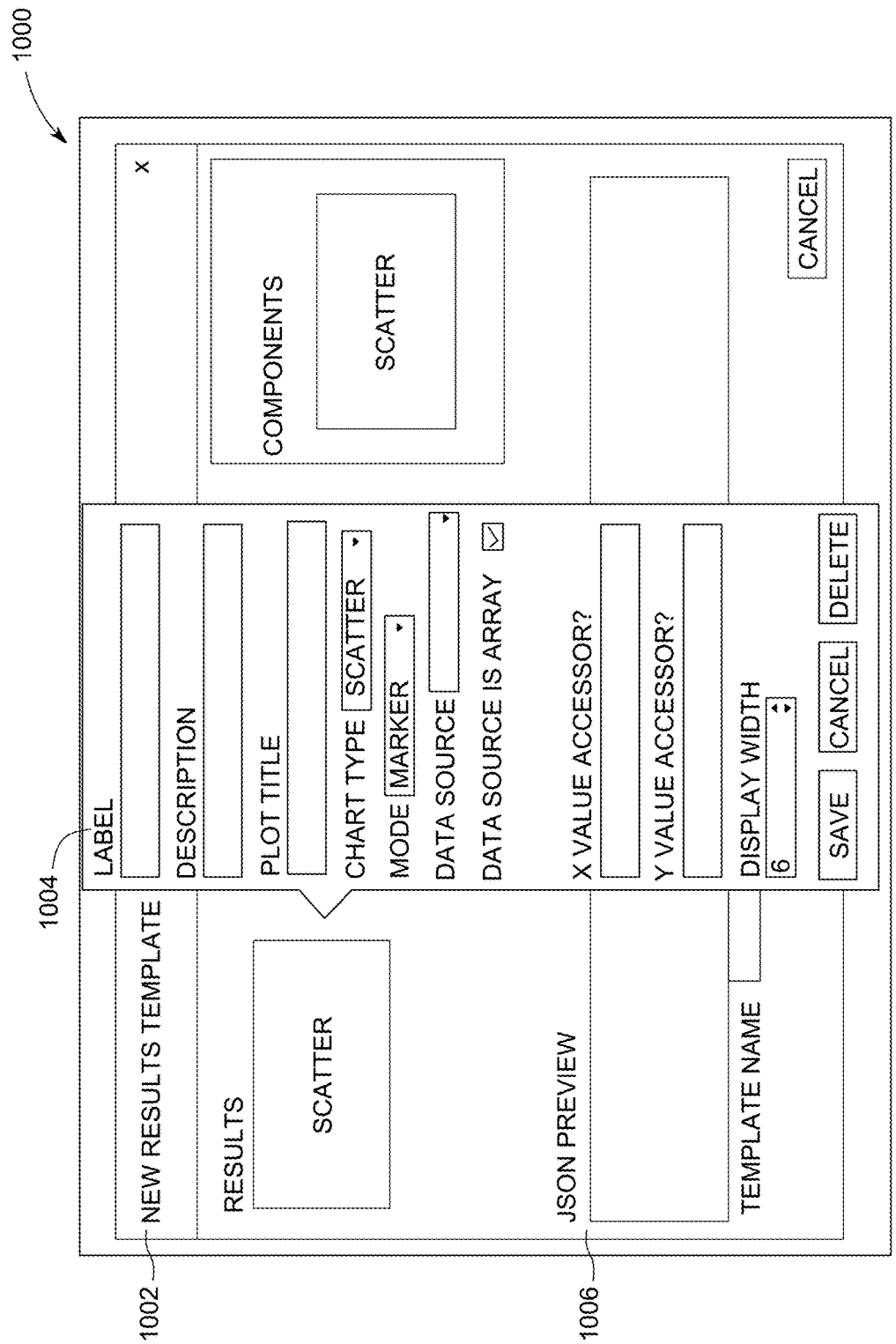
FIG. 10 illustrates an interface according to some embodiments.

Turning to FIGS. 9 and 10, a user interface for registering the model/technique 900 and results 1000 is provided, respectively. In one or more embodiments, registration of the technique may occur before the model is created so that a model developer may then go choose the technique to build the model. In one or more embodiments, registering the technique may enable any code to be added by a model developer. In one or more embodiments, a technique developer (typically an advanced user) may develop a technique based on their own expertise and then may use the system's API definitions to "wrap" their technique in a provided docker container. In one or more embodiments, this may include providing build scripts for building the container for the new analytic and executing the containers. Then, using the interface shown in 900, the technique developer may set the input and output pages for the technique along with the command required to run the technique. Once the registration is successfully completed and the technique is approved for use, the technique may come up in list of available techniques for any user to build models.

After the technique 900 is registered, the model developer may also register a results template 1002 to provide a structure for the results of execution of the technique. For example, the template 1002 may include one or more fields 1004 that may be populated with information. As shown in FIG. 10, for example, the fields 1004 may include a label for the results, a description, a plot title, a chart type, a mode, a data source, an indication if the data source an array, an indication if an array item is an object, an X value accessor a y-value accessor, and a display width. In one or more embodiments the information to populate the fields may be selected from at least one of drop-down menus (e.g., chart type, mode, data source, display width), user-entry fields (e.g., label, description, plot title), selection of boxes or radio buttons (data source is array, array item is object), and selectable from another source (e.g., X value accessor, y value accessor). In one or more embodiments, the results template 1002 may include a preview of the output 1006 of the model technique.

In one or more embodiments, S412-S416 may be repeated for each component model 302 that forms a functional part of the analytic model 236. Then after all of the self-aware components 310 that contribute to the analytic model 236 are generated, in S418 the analytic model 236 is executed.

Figure 11:
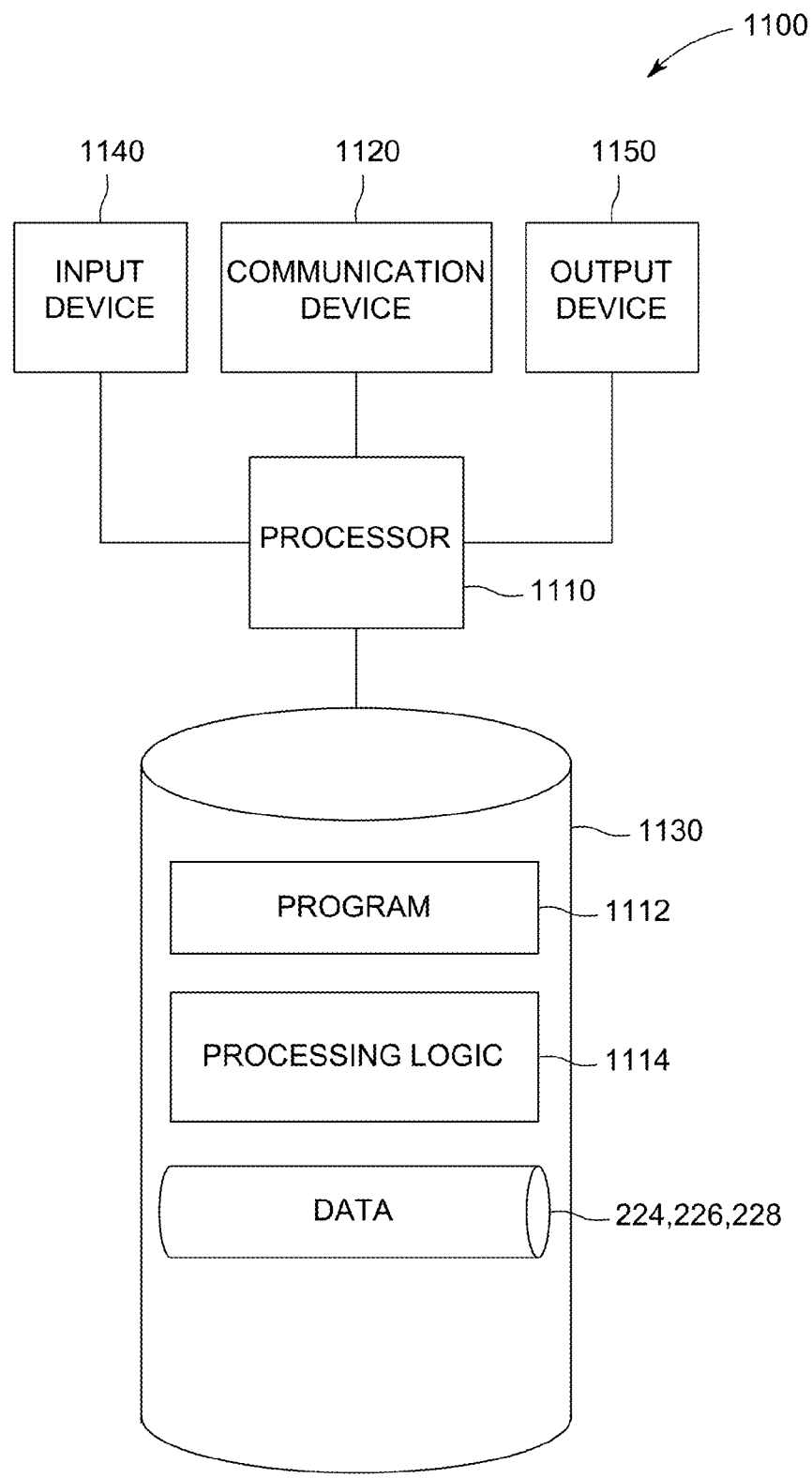
FIG. 11 illustrates s a block diagram of a system according to some embodiments.

Note the embodiments described herein may be implemented using any number of different hardware configurations. For example, FIG. 11 illustrates an analytic development and processing platform 1100 that may be, for example, associated with the systems 100, 200 of FIGS. 1 and 2, respectively. The analytic development and processing platform 1100 comprises an analytic and development processor 1110 ("processor"), such as one or more commercially available Central Processing Units (CPUs) in the form of one-chip microprocessors, coupled to a communication device 1120 configured to communicate via a communication network (not shown in FIG. 11). The communication device 1120 may be used to communicate, for example, with one or more users. The analytic development and processing platform 1100 further includes an input device 1140 (e.g., a mouse and/or keyboard to enter information about the installed product or the model) and an output device 1150 (e.g., to output and display the data and/or recommendations).

The processor 1110 also communicates with a memory/storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 may store a program 1112 and/or analytic development and processing logic 1114 for controlling the processor 1110. The processor 1110 performs instructions of the programs 1112, 1114, and thereby operates in accordance with any of the embodiments described herein. For example, the processor 1110 may receive a component model and then may apply the modeling module 108 via the instructions of the programs 1112, 1114 to generate a component 310 and then an analytic model 236.

The programs 1112, 1114 may be stored in a compressed, compiled and/or encrypted format. The programs 1112, 1114 may furthermore include other program elements, such as an operating system, a database management system, and/or device drivers used by the processor 1110 to interface with peripheral devices.

As used herein, information may be "received" by or "transmitted" to, for example: (i) the platform 1100 from another device; or (ii) a software application or module within the platform 1100 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a modeling module. The method steps can then be carried out using the distinct software modules and/or sub-modules of the system, as described above, executing on one or more hardware processors 1110 (FIG. 11). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. An apparatus for creating a prediction regarding operations of an installed product comprising:
   one or more component models of an analytic model for the installed product, wherein the analytic model makes predictions of the installed product;
   an application programming interface (API) wrapper associated with each of the one or more component models, the API wrapper including information about one or more inputs to the component model;
   wherein each of the one or more component models and the associated API wrapper including a complete file-system form a self-aware component; and
   the analytical model, using one or more of the self-aware components, executes the same way regardless of an execution environment and creates the prediction regarding the installed product in the execution environment;
at least a communication channel to supply one or more outputs from the analytic model to the installed product to modify a condition of one or more physical elements of the installed product.

2. The apparatus of claim 1, wherein information about the one or more inputs to the component model further comprises:
at least one source of the one or more input.

3. The apparatus of claim 2, wherein the at least one input source is a file, a data stream, a data warehouse, a user, and a database.

4. The apparatus of claim 1, wherein information about the one or more outputs from the component model further comprises:
at least one destination of the one or more outputs.

5. The apparatus of claim 4, wherein at least one of the one or more outputs is stored in a JSON file.

6. The apparatus of claim 1, wherein each component is operative to:
receive the one or more inputs from one or more sources;
execute the component model to generate one or more outputs; and
transmit the one or more outputs to at least one destination.

7. The apparatus of claim 1, wherein a first component of the analytic model communicates with a second component of the analytic model via the API wrapper.

8. The apparatus of claim 1, wherein information about the one or more inputs to the component model includes a definition of the input.

9. The apparatus of claim 1, wherein each of the one or more components is self-registering.

10. The apparatus of claim 9, wherein the self-registering component provides information about its contents, working rules and capabilities via emission of a unique signature to register itself in a system with valid interface and security settings.

11. The apparatus of claim 1, wherein the API wrapper includes a modeling technique to create the analytic model.

12. The apparatus of claim 1, wherein the component includes an integrated self-test for periodically checking the component model with new and existing datasets and trigger corrective actions to update the component model if the component model quality deviates beyond defined thresholds.

13. The apparatus of claim 1, wherein metadata for the component is stored in the component when the component is running.

14. The apparatus of claim 1, wherein if one component of the analytic model fails, the whole analytic model does not fail.

15. A method for creating a prediction regarding operations of an installed product comprising:
providing the installed product;
receiving one or more component models of an analytic model for the installed product, wherein the analytic model makes predictions of the installed product;
defining an AP wrapper associated with the component model, the definition including information about one or more inputs to the component and one or more outputs of the component model;
generating one or more self-aware components from the component model and the API wrapper including a complete filesystem;
using one or more of the self-aware components executing the analytical model the same way regardless of an execution environment and creates the prediction regarding the installed product in the execution environment; and
modifying a condition of one or more physical elements of the installed product based on an output signal from the analytic model.

16. The method of claim 15, further comprising:
executing, via a computer processor, an analytic model for the installed product by executing each component.

17. The method of claim 16, wherein executing each component further comprises:
executing a model task of each component model.

18. The method of claim 15, wherein each component and the analytic model is self-registering.

19. The method of claim 15, further comprising:
receiving information about the one or more inputs from at least one or more input sources.

20. The method of claim 15, further comprising:
transmitting information about the one or more outputs from the component model to at least one destination.

21. The method of claim 15, wherein a first component of the analytic model communicates with a second component of the analytic model via the API wrapper.

22. The method of claim 15, wherein information about the one or more inputs to the component model includes a definition of the input.

23. A system for creating a prediction regarding operations of an installed product comprising:
one or more of the installed products;
a computer processor to:
receive a component model of an analytic model for the installed product, wherein the analytic model makes predictions of the installed product;
receive an application programming interface (API) wrapper associated with each of the one or more component models, the API wrapper including information about one or more inputs to the component model and one or more outputs of the component model, wherein the component model and the API wrapper including a complete filesystem form a self-aware component;
the analytical model, using one or more of the self-aware components, executes the same way regardless of an execution environment and creates the prediction regarding the installed product in the execution environment:
at least one communication channel for supplying one or more inputs to the component model;
a memory in communication with the computer processor, the memory storing the component and additional program instructions; and
wherein the communication channel supplies output from the analytic model to the installed product to modify a condition of one or more physical elements of the installed product.

24. The system of claim 18, wherein the processor is operative with the additional program instructions to perform functions as follows:
receiving the one or more inputs from one or more input sources;
executing the component model to generate one or more outputs; and
transmitting the one or more outputs to at least one output destination.

25. The system of claim 18, wherein each component and the analytic model is self-registering.

* * * * *